(12) United States Patent
Rothschild

(10) Patent No.: US 8,600,337 B2
(45) Date of Patent: Dec. 3, 2013

(54) COMMUNICATING A SECURITY ALERT

(75) Inventor: Leigh M. Rothschild, Sunny Isles Beach, FL (US)

(73) Assignee: LMR Inventions, LLC, Bay Harbour Island, FL (US)

( * ) Notice: Subject to any disclaimer, the term of this patent is extended or adjusted under 35 U.S.C. 154(b) by 1078 days.

(21) Appl. No.: 12/082,986

(22) Filed: Apr. 16, 2008

(65) Prior Publication Data

US 2009/0264093 A1 Oct. 22, 2009

(51) Int. Cl.
*H04M 11/04* (2006.01)

(52) U.S. Cl.
USPC .................. 455/404.1; 455/404.2; 455/569.2; 455/575.9

(58) Field of Classification Search
USPC .......... 455/404.1–404.2, 414.2, 456.1–456.3, 455/457
See application file for complete search history.

(56) References Cited

U.S. PATENT DOCUMENTS

| | | | |
|---|---|---|---|
| 5,572,204 A | 11/1996 | Timm et al. | |
| 5,687,215 A | 11/1997 | Timm et al. | |
| 5,859,628 A | 1/1999 | Ross et al. | |
| 5,890,061 A | 3/1999 | Timm et al. | |
| 5,914,675 A | 6/1999 | Tognazzini | |
| 6,226,510 B1 | 5/2001 | Boling et al. | |
| 6,501,420 B2 | 12/2002 | Townsend et al. | |
| 6,636,732 B1 | 10/2003 | Boling et al. | |
| 7,031,475 B2 | 4/2006 | Kuraoka et al. | |
| 7,046,140 B2 | 5/2006 | Adamczyk et al. | |
| 7,071,821 B2 | 7/2006 | Adamczyk et al. | |
| 7,212,111 B2 | 5/2007 | Tupler et al. | |
| 7,251,471 B2 | 7/2007 | Boling et al. | |
| 7,747,003 B2 | 6/2010 | Regen et al. | |
| 2001/0017912 A1* | 8/2001 | Baum et al. ...................... 379/37 |
| 2002/0098874 A1* | 7/2002 | Zirul et al. ...................... 455/564 |
| 2004/0032932 A1* | 2/2004 | Kucmerowski et al. ......... 379/45 |
| 2004/0152441 A1 | 8/2004 | Wong | |
| 2004/0229564 A1* | 11/2004 | Huang et al. .................. 455/41.2 |
| 2004/0266390 A1* | 12/2004 | Faucher et al. ............ 455/404.1 |
| 2005/0083195 A1* | 4/2005 | Pham et al. ............... 340/539.13 |
| 2005/0176402 A1 | 8/2005 | Verloop et al. | |
| 2006/0141960 A1 | 6/2006 | Fernandez et al. | |
| 2006/0286930 A1 | 12/2006 | Rathus et al. | |
| 2007/0022384 A1 | 1/2007 | Abbott et al. | |
| 2007/0082618 A1* | 4/2007 | Chen et al. .................... 455/66.1 |
| 2007/0082652 A1 | 4/2007 | Hartigan et al. | |
| 2007/0178944 A1* | 8/2007 | Mitsuru et al. ............. 455/569.1 |
| 2007/0189246 A1* | 8/2007 | Molnar ......................... 370/338 |
| 2007/0197266 A1* | 8/2007 | Chang ........................ 455/575.2 |
| 2007/0218923 A1 | 9/2007 | Park et al. | |

(Continued)

*Primary Examiner* — Dai A Phuong

(74) *Attorney, Agent, or Firm* — Cuenot, Forsythe & Kim, LLC

(57) ABSTRACT

A device, system and method for confidentially communicating a security alert to a monitoring service or other entity are provided. A mobile device of the present disclosure, e.g., a cellular phone, GSM phone, media player, personal digital assistant (PDA), etc., will enable a user to send a security alert or emergency communication to another party, e.g., an alerting such a monitoring service, where the user can accomplish this alert without letting anyone know that they are sending the alert so that the user does not put themselves in further danger by alerting the perpetrator of the crime to the alert. Moreover, the user will be able to send the monitoring service information on the nature of the alert including a geographic location of the user.

16 Claims, 5 Drawing Sheets

(56) References Cited

U.S. PATENT DOCUMENTS

| | | |
|---|---|---|
| 2007/0265032 A1* | 11/2007 | Aisenberg .................. 455/556.1 |
| 2008/0003975 A1 | 1/2008 | Kim et al. |
| 2008/0220718 A1* | 9/2008 | Sakamoto et al. ........... 455/41.2 |
| 2008/0300025 A1* | 12/2008 | Song et al. ................. 455/569.1 |
| 2010/0027806 A1 | 2/2010 | Heine et al. |
| 2011/0021173 A1 | 1/2011 | Randhawa et al. |
| 2011/0143705 A1 | 6/2011 | Ogram et al. |
| 2012/0252401 A1 | 10/2012 | Rothschild |

* cited by examiner

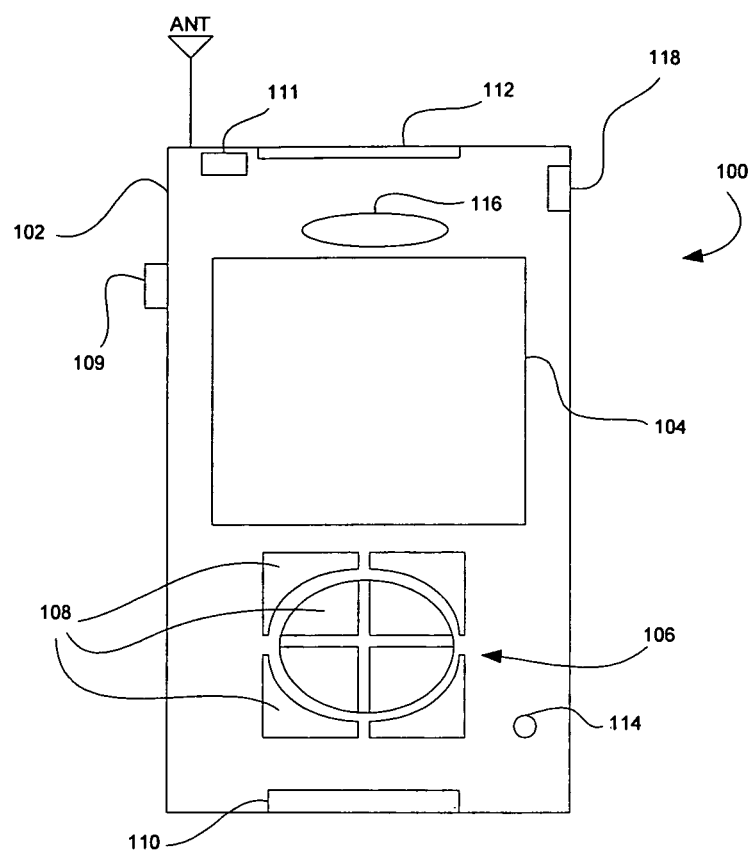
FIG. 1A
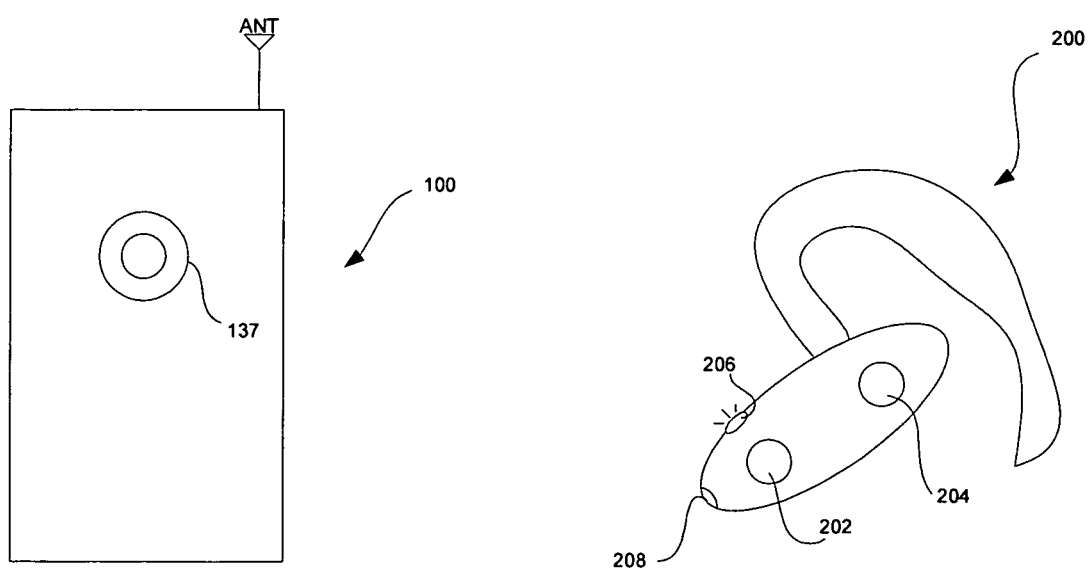
FIG. 1B
FIG. 1C

COMMUNICATING A SECURITY ALERT

BACKGROUND

1. Field

The present disclosure relates generally to mobile device and alerting systems, and more particularly, to devices, systems and methods for confidentially communicating a security alert to a monitoring service or other entity.

2. Description of the Related Art

Portable digital devices are now common. Examples include the various Windows™ Pocket PC devices which have an operating system created by Microsoft Corporation of Redmond, Wash. Other devices include various mobile phone devices including many that have built-in camera imaging devices. Still other portable digital devices include portable media players from Creative Media of Singapore, Samsung of South Korea, Archos, Inc. of Irvine, Calif. and Apple Computers, Inc. of Cupertino, Calif. Additionally, Sony of New York and Japan manufacture a portable game playing device called the Sony PSP™ (PlayStation Portable).

Increasingly, many of these portable media devices include a means of transmitting and receiving digital content. Various communications technologies are frequently built into these devices. Examples of portable communicating devices include mobile phones which employ GSM, CDMA, W-CDMA, and FOMA technology, among other standards, to send and receive data in addition to handling voice communications. Many of the portable media devices also include transmission capabilities including WiFi (IEEE 802.11a, b, g and x among others), Bluetooth, infrared, etc. to allow the user to transmit and receive digital content. Furthermore, some mobile devices having transmission capabilities can use this capability to achieve voice communications such as by Voice over Internet Protocol (VoIP) when connected to the Internet or other packet switched networks.

Due to these advanced features, mobile telephones and other mobile devices are some of the most prevalent consumer electronic devices. Hundreds of millions of these devices are sold each year and are used around the world.

Increasingly crime against individuals (many of it violent) is becoming more and more prevalent. Further, many individuals also suffer unexpected medical emergencies. Therefore, due to the prevalence of mobile devices, a need exists for techniques to enable a user to utilize their personal mobile device (such as a cell phone or integrated cell phone such as a Blackberry device) to alert a security monitoring service or a designated representative (such as a friend or husband/wife/child, etc) that they are in danger and/or having an emergency.

SUMMARY

Devices, systems and methods for confidentially communicating a security alert to a monitoring service or other entity are provided. The present disclosure enables a user to alert a security monitoring service or other entity using their mobile communications device (such as a cellular telephone or a web-enabled digital media device) that they are in danger and then send relevant information on the nature and location of the danger to the monitoring service. All the aforementioned to be accomplished so that no one but the user is aware that the alert is being transmitted.

According to one aspect of the present disclosure, a mobile device for communicating an alert is provided, the device including a housing; a trigger module operative to receive a trigger signal from a user of the mobile device; a storage module operative to store at least one contact; a processing module operative to receive the trigger signal and, upon receipt of the trigger signal, to access the storage module to retrieve the at least one contact; and a communication module operative to communicate an alert to the at least one contact.

In one aspect, the mobile device further includes at least one input key disposed on the housing operative to generate the trigger signal. Optionally, the trigger signal is generated in response to a predetermined combination of the at least one input key.

In another aspect, the mobile device further includes a peripheral device located remotely from the housing operative to generate the trigger signal. In one aspect, the peripheral device is wirelessly coupled to the mobile device, for example, a wireless headset.

In a further aspect, the mobile device includes a microphone operative to receive a voice commend and generate the trigger signal therefrom.

In another aspect, the alert includes at least one of an identifier, a telephone number of the user and at least one prestored message from the storage module.

In a further aspect, the mobile device includes a locational information module operative to determine a geographic location of the mobile device, wherein the communicated alert includes the determined geographic location.

According to another aspect, a system for communicating an alert includes a mobile device including a housing; a trigger module operative to receive a trigger signal from a user of the mobile device; a storage module operative to store an address of at least one server; a processing module operative to receive the trigger signal and, upon receipt of the trigger signal, to access the storage module to retrieve the address of at least one server; and a communication module operative to communicate an alert to the at least one server; the at least one server configured for receiving the alert from the mobile device along with an identifier and for retrieving information relating to a user of the mobile device based on the identifier; and a communications network for coupling the mobile device to the at least one server.

BRIEF DESCRIPTION OF THE DRAWINGS

The above and other aspects, features, and advantages of the present disclosure will become more apparent in light of the following detailed description when taken in conjunction with the accompanying drawings in which:

FIG. 1A is front view of a mobile device for confidentially communicating a security alert according to an embodiment of the present disclosure;

FIG. 1B is a rear view of a device for confidentially communicating a security alert;

FIG. 1C is front view of a wireless peripheral device having an input key to trigger an alert in the mobile device;

DETAILED DESCRIPTION

Figure 2:
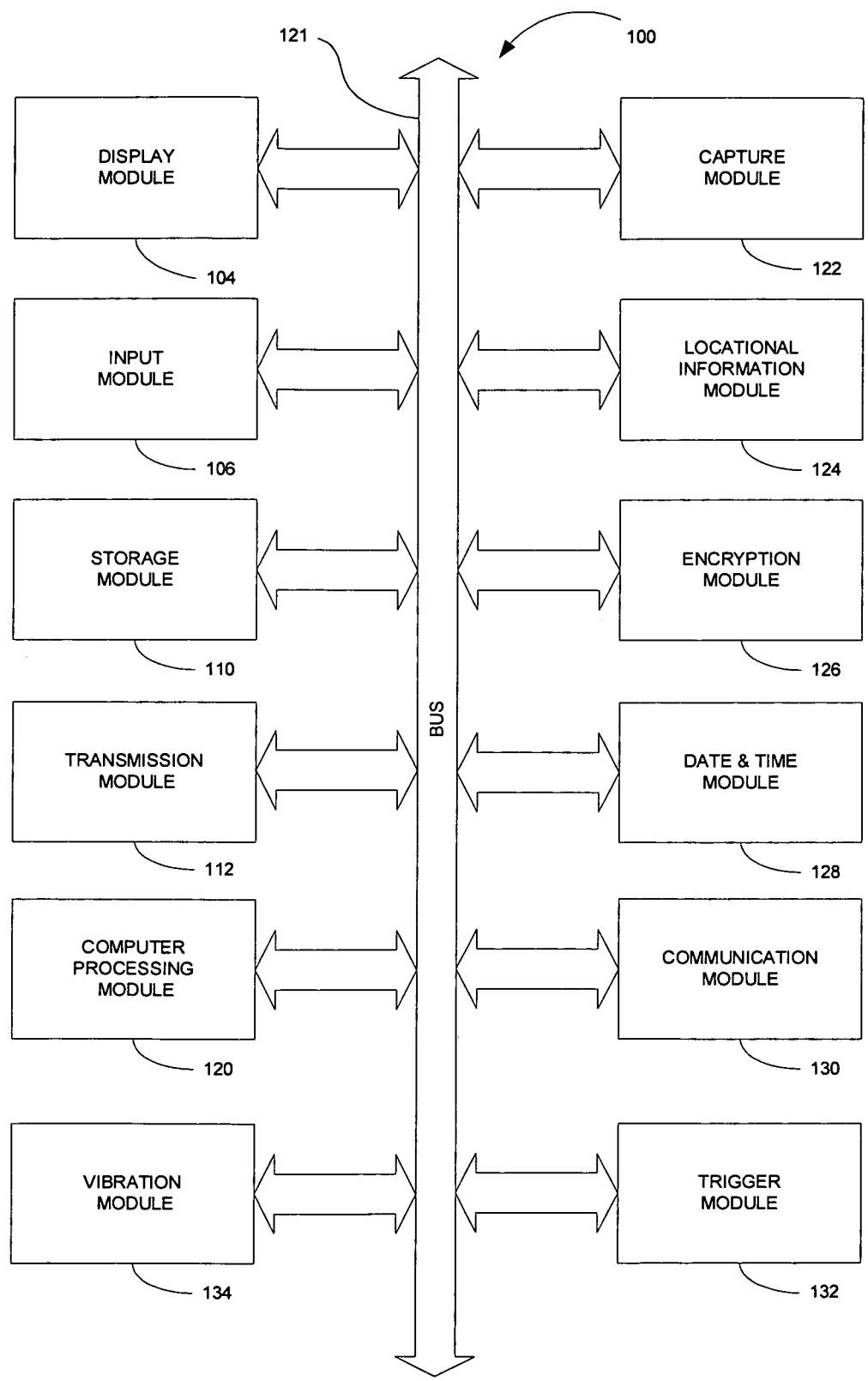
FIG. 2 is a block diagram of various modules included in the mobile device illustrated in FIG. 1.

Preferred embodiments of the present disclosure will be described hereinbelow with reference to the accompanying drawings. In the following description, well-known functions or constructions are not described in detail to avoid obscuring the present disclosure in unnecessary detail.

A device, system and method for confidentially communicating a security alert to a monitoring service or other entity are provided. A mobile device of the present disclosure, e.g., a cellular phone, GSM phone, media player, personal digital assistant (PDA), etc., will enable a user to send a security alert or emergency communication to another party, e.g., an alerting such a monitoring service, where the user can accomplish this alert without letting anyone know that they are sending the alert so that the user does not put themselves in further danger by alerting the perpetrator of the crime to the alert. Moreover, the user will be able to send the monitoring service information on the nature of the alert including in a geographic location of the user. Various types of mobile device are contemplated by the present disclosure and, depending on the mobile device employed, the alerting party will take various forms. In one embodiment, the alerting party will include a human party operator to interact with the user over the mobile device. In a further embodiment, a server which will receive the alert from the mobile device and take control of the mobile device to retrieve or acquire information about the situation of the user of the mobile device.

Referring to FIG. 1A, a mobile device 100 for confidentially communicating a security alert to a monitoring service or other entity in accordance with an embodiment of the present disclosure is illustrated. The mobile device 100 includes various electrical components, which will be described in detail below, disposed in a generally rectangular housing 102. A display module 104 is provided for displaying video and image media content, such as movies, animations, etc. and a speaker 116 is provided configured to produce audio, e.g., music or a soundtrack associated with a video. An audio port 118 will be configured to receive a plug or connector from a headphone, stereo system, etc. to stream the audio to the connected device. It is to be appreciated that when an external device is connected to the audio port 118 the speaker 116 will be disabled. Input module 106 includes a plurality of buttons 108 for inputting data and navigating through a plurality of menus. A touch screen overlaid upon the display module 104 may also be coupled to the input module for facilitating user input. The mobile device 100 further includes a storage module 110 for storing a plurality of content and/or a list of contacts, i.e., a list of persons or entities to be contacted upon triggering an alert.

A transmission module 112 is provided for transmitting/receiving data and/or content to another device, e.g., a personal computer, a personal digital assistant (PDA), a server residing on the Internet, etc. Optionally, the mobile device 100 may include a microphone 114 for acquiring audio from the user of the device to input data.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM) (not shown). The various processes and functions described herein may either be part of the micro instruction code or part of an application program (or a combination thereof which is executed via the operating system. Exemplary operating systems include but are not limited to SymbianOS, Windows Mobile/Windows CE, Palm OS, Linux, Blackberry OS, BREW, etc. which have been developed for mobile computing applications and can handle both data computing and communication applications, e.g., voice communications.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The computer processing module 120 may further include, in addition to a microprocessor, a digital signal processor (DSP) for decoding stored audio, video and photo files to be played on the media device 100. As is known in the art, the DSP may include several known decompression algorithms for decompressing stored media content, e.g., a MP3 file. The device 100 of the present disclosure will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The device 100 will also contain a display module 104 for displaying digital information such as video files, image files, text files, etc. This display may be in any current form in the art, including Liquid Crystal Displays (LCD), Light emitting diode displays (LED), Cathode Ray Tube Displays (CRT) or any other type of display currently existing or existing in the future. The display module 104 may also include an audio output device, e.g., a speaker 116, audio port 118, etc., allowing the user to also hear audio output from the device 100, e.g., audio associated with a video, a MP3 file, etc.

The mobile device 100 of the present disclosure will contain a user input module 106 to either receive user instructions via text input by the way of buttons 108, a standard keyboard interface coupled to the device, or a character recognition capture device which translates user text input into alphanumeric characters. Preferably, the character recognition device is a touch screen which overlays the display module 104 and text is entered via a pen-like stylus. Such input devices are standard and currently available on many electronic devices including portable digital assistants (PDAs) and cellular telephones. Optionally, microphone 114 may be further coupled to the input module 106 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user will utilize the user input module 106 to enter various data, for example, to enter payment information, to initiate communication with a remote server, to flag desired content to be downloaded, to request an initial selection of media content to be downloaded, etc.

In one embodiment, a single button or key 109 will be provided on the housing 102 to generate a trigger signal as will be described below. The button 109 is either coupled to the input module 106 or to a trigger module 132.

The storage module 110 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. The storage module 110 includes a list of contacts, e.g., alerting parties, to be alerted upon generation of a trigger. The storage module 110 also includes pre-defined messages that are transmitted to an alerting party with the alert.

The transmission module 112 will enable the device 100 to transmit or transfer information to other computing devices and to receive information from other computing devices, e.g., digital media files, encryption/decryption keys, etc. The transmission module 112 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols or systems currently existing or to be developed for wirelessly transmitting data. The transmission module will compress and encode the encrypted information for transmission using any known wireless communication technology. In one embodiment, antenna ANT is coupled to the transmission module 112 for extending the wireless transmission range of the device 100.

A capture module 122 is provided to capture an image desired by the user in digital form, e.g., an image of a perpetrator of a crime. The capture module 122 includes an image sensor, an analog-to-digital (A/D) converter and a digital signal processor (DSP). Referring to FIG. 1B when a user desires to capture an image, a lens 137 disposed on a rear side of the device is aimed at a subject of the image and is used in conjunction with display module 104 for positioning a subject of the image in lieu of a viewfinder. Light is allowed to enter through the lens 137 and shine on the image sensor, e.g., a charge-coupled device (CCD) or complimentary metal-oxide semiconductor (CMOS). The image sensor includes preferably millions of photosensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 110.

A locational information module 124 will be provided for determining a location of the device 100 and/or user. The locational information module 122 may include a receiver and antenna ANT employing conventional locational information processing technology such as Global Positioning Satellite (GPS) Technology, Loran Technology, or any other available locational technology, to indicate the exact location, e.g., latitude, longitude and altitude, of the device 100. Exemplary GPS receivers and antennas are described in U.S. Pat. Nos. 5,654,718 and 6,775,612, the contents of both of which are herein incorporated by reference. It is to be appreciated that the latitude, longitude and altitude may be used to interact with maps stored in memory or in the storage module 110 of device 100 to determine the city, state or address of the location the device 100.

The mobile device 100 will also include an encryption module 126. The encryption module 126 will use conventional code encryption algorithms currently in use or that will be in use in the future such as symmetric-key algorithms, e.g., DES, Triple-DES, Blowfish, RC2, RC4, RC5, etc, and asymmetric-key algorithms, e.g., Diffie-Hellman, RSA, ElGamal, etc. to data that is stored in the storage module 110. The encryption module 126 may also encrypt photos or the pre-defined massage before transmission to another device or server.

Furthermore, the device 100 will include a date and time module 128. The date and time module 128 will use standard computer chip processing technology widely in use, e.g., a crystal, or alternatively, input from a GPS receiver to supply the date and time.

In one embodiment, the device 100 according to the principles of the present disclosure is embodied as a mobile phone including the modules and architecture illustrated in FIG. 2. In this embodiment, microphone 106 is further coupled to a communication module 130 for encoding a user's speech to be transmitted via antenna ANT using CDMA, PCS, GSM or any other known wireless communication technology. The user will enter phone numbers to be dialed via the touch screen, or alternatively, as is known in the mobile phone art, the device 100 may include a full QWERTY keyboard as an input module to enter text information. In addition to producing audio from audio or multimedia content, speaker 116 will be coupled to the antenna ANT and a decoder for receiving and decoding voice communication from another mobile phone.

It is to be appreciated that the communication module 130 may include a single integrated circuit chip to perform data transfer and voice communications or a single module including a separate data transfer chip, e.g., a WiFi transceiver, and a separate voice communication chip, e.g., a CDMA chip. In one embodiment, the communication module will operate on the wireless GPRS (General Packet Radio Service) data protocol or a 3G protocol such as W-CDMA, CDMA2000 and TD-SCDMA. Both the GPRS and 3G protocols have the ability to carry both voice and data over the same service.

A mobile device of the present disclosure also includes a trigger module 132 for receiving a trigger signal from a user. It is to be appreciated the trigger module 132 may be a hardware module disposed in the housing 102 of the device 100 or a software module running on processing module 120. As will be described in more detail below, the trigger module 132 is set into a security mode and awaits a trigger signal from the user. Once the trigger signal is received, the trigger signal is passed onto the processing module 120 to initiate communicating an alert to a monitoring service, a person designated by the user, etc.

It is to be appreciated that the trigger signal may be generated by a key or button on the device 100 or by a peripheral device that is coupled either hardwired or wirelessly to the device 100. For example, in one embodiment, the trigger signal is generated by pressing the button 109 disposed on the housing 102 of the device 100. In another embodiment, the trigger signal is generated by pressing a predetermined combination of buttons 108 or keys when a QWERTY keyboard is used. In a further embodiment, the trigger signal is generated by a button on a peripheral device such as a wireless headset 200 as shown in FIG. 1C. As is known in the art, the wireless headset 200 may be worn by a user over their ear while a coupled mobile phone is concealed on the user, e.g., the mobile phone is disposed in a pocket. The headset 200 will include at least one button wherein a first button 202 is a power switch to activate the headset 200 and a second button 204 is designated to generate a trigger signal.

It is to be appreciated that the device 100 described above is an exemplary device and may include all or a portion of the modules described above. Furthermore, it is to be appreciated that existing mobile devices, e.g., mobile phones, digital media playback device, may be used in accordance with the principles of the system and method of the present disclosure described below.

Figure 3:
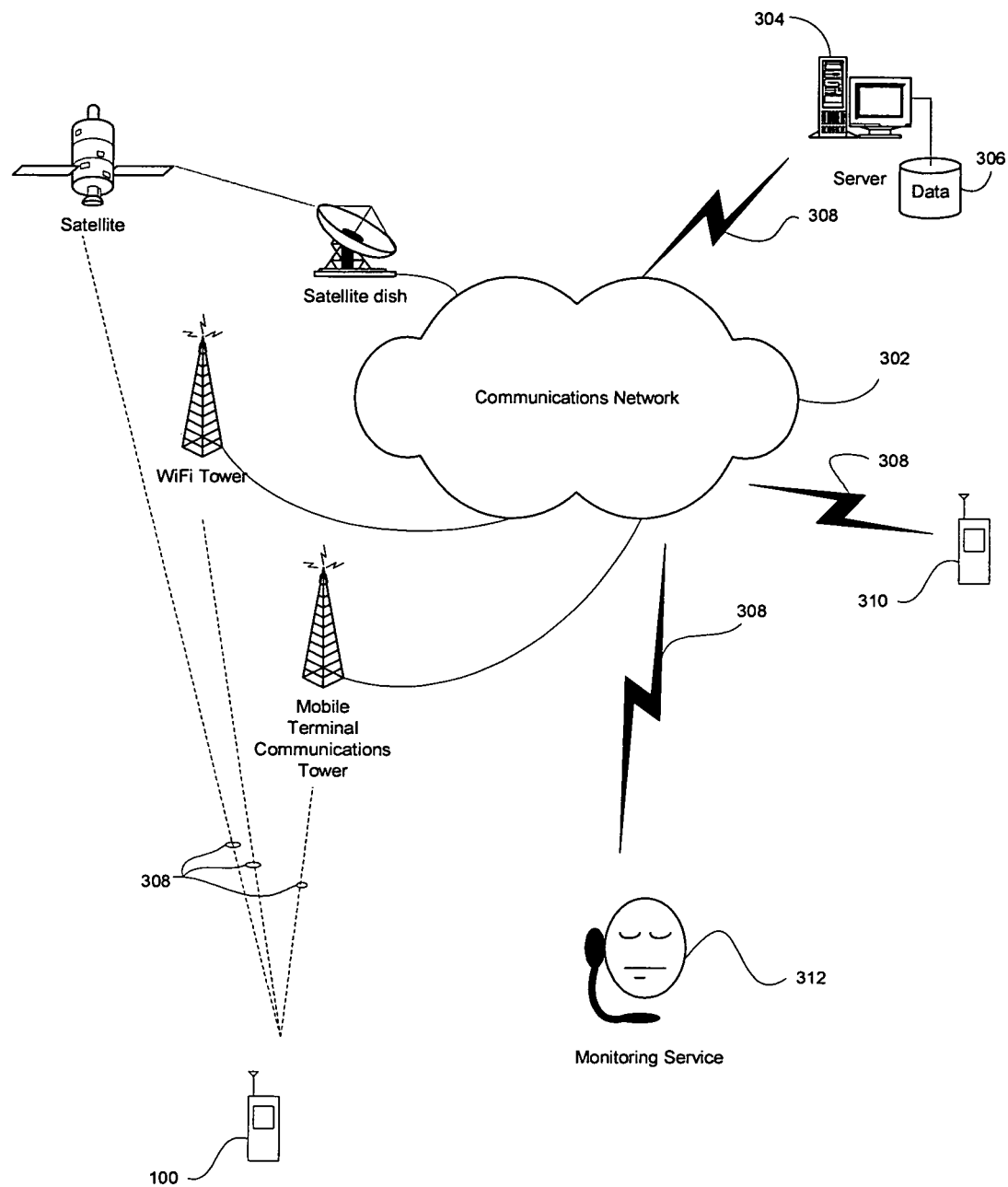
FIG. 3 illustrates a system for confidentially communicating a security alert to a monitoring service or other entity in accordance with an embodiment of the present disclosure.
Figure 4A:
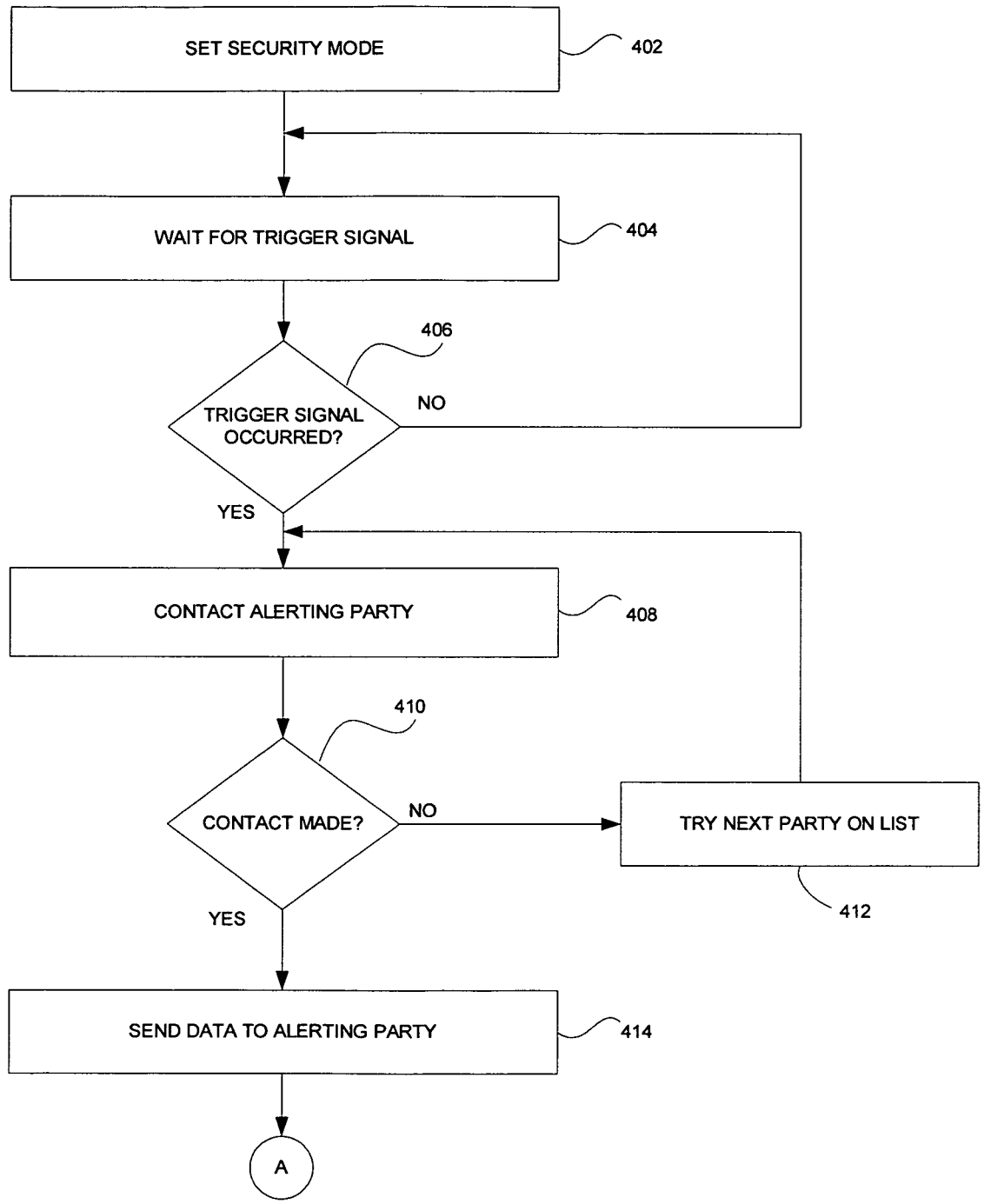
FIG. 4A-C are flow diagrams illustrating a method for confidentially communicating a security alert according to an embodiment of the present disclosure.

A system and method for confidently or secretly communicating an alert will be described in relation to FIGS. 3 and 4. Referring to FIG. 3, a system in accordance with the present disclosure is illustrated. The system includes a mobile device 100 as described above. The device 100 will communicate to a server 304, a contact designated by the user 310, e.g., a friend or relative, or a monitoring service 312 via a communication network 302. The device 100 and server 304, contact 310 and monitoring service 312 may be connected to the communications network 302, e.g., the Internet, by any known means, for example, a hardwired or wireless connection 308, such as dial-up, hardwired, cable, DSL, satellite, cellular, PCS, wireless transmission (e.g., 802.11a/b/g), etc. It is to be appreciated that the network 302 may be any network known in the art including a telephone network (e.g., a plain old telephone service (POTS) network), a mobile phone network (e.g., cellular, PCS. GSM, etc.), a computer network, a switch data packet network, etc. In one embodiment, the network 302 may be a local area network (LAN), wide area network (WAN), the Internet or any known network that couples a plurality of computers and digital devices to enable various modes of communication via network messages. Furthermore, the server 304 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc. The server 304 will further include a storage medium 306 for storing a database which links an identifier, e.g., a telephone number, to a user of the system of the present disclosure, the details of which will be described in detail below.

Initially, in 402, a user will set the mobile device into a security mode. In the security mode, the trigger module 132 will wait for a trigger signal to be generated by the user. In one embodiment, the mobile device is programmed so that the user may designate one push of any key on the phone including keys other then the keyboard keys (such as key 109 on the side of the device) that will trigger the alert. For example, a user may push the 9 key or alternatively the side key 109 for a predetermined number of seconds to generate the trigger signal. Alternatively, the user will push a combination of keys that the user previously predefined. The user may define how long an individual key or combination of keys must be depressed to trigger the alert and may optionally define a key press that would untrigger or stop the alert.

In a further embodiment, the trigger signal may be generated by pressing a key/button on a peripheral device connected to the phone such as a headset (connected by Bluetooth, or cable, etc.). Referring to FIG. 1C, the wireless headset 200 may be worn by a user over their ear while a coupled mobile phone is concealed on the user, e.g., the mobile phone is disposed in a pocket. The headset 200 will include at least one button wherein a first button 202 is a power switch to activate the headset 200 and a second button 204 is designated to generate a trigger signal. By pressing the second button 204 while the mobile device is in the security mode, a user can covertly generate a trigger signal and send an alert as will be described further below. It is to be appreciated that an existing button on the wireless headset 200 can be programmed to generate the trigger signal by holding it down for a predetermined duration or by pressing a combination of buttons on the wireless headset in a predefined sequence.

In another embodiment of the present disclosure, the trigger signal may also be triggered by a keyword voice command spoken into the microphone 114 or into a peripheral microphone 208 connected to the phone by cable or Bluetooth or any other connection now know or henceforth known in the future to connect the microphone to the mobile device such as headset 200. In this embodiment, the user preprograms a word or plurality of words that will be recognized by the mobile device to indicate that a trigger signal is to be generated. The mobile device 100 will use standard voice recognition software and computer processing power to decode the command and generate the trigger signal. It is to be appreciated that the mobile device is to be placed in the security mode before issuing a voice command to prevent a false trigger signal from being generated upon the predefined or preprogrammed voice command being uttered mistakenly.

Once in the security mode, the trigger module 132 will wait for receipt of a trigger signal, in step 404. In step 406, if no trigger signal is received, the method will loop back to step 404 until a trigger signal is received or the security mode is turned off.

If a trigger signal is received in step 406, the mobile device will attempt to contact an alerting party predefined by the user, in step 408. In one embodiment, the mobile device 100 will dial a phone number that has been prestored in the storage module 110 and that the user has selected as the number of the monitoring service or person they wish to notify of the alert. In a preferred embodiment, multiple numbers may be designated so that if a first number does not respond the second number will be sequentially dialed and so on.

In one embodiment, if the mobile device 100 is connected to a peripheral headphone (for example, by any connection means currently known or known in the future, including but not limited to Bluetooth or cable) and if the user has prestored the request, the mobile device 100 will tell the user with voice synthesis that the alert is being made and optionally who the alert is going to. Optionally, the user can be alerted that the alert is being sent by a vibration or light signal. It is to be appreciated that the mobile device 100 may include a vibration module 134 as is known in the art and disposed in the housing 102. Furthermore, it is contemplated the alerting light 111 may be disposed on the housing 102 of the mobile device 100 or on any used peripheral device, e.g., light 206 on headset 200. As indicated earlier, the user may call off the alert at any time by using a keyboard or voice command that has been preprogrammed.

In a preferred embodiment of the present disclosure, the mobile device 100 will automatically turn on the microphone 114 of the device so that the alerting party may monitor the events that are occurring around the user. It is to be appreciated that the speaker 116 of the device will not be activated so that a person in close proximity to the mobile device 100 or user would not realize that he/she/they are being monitored by the alerting party.

In step 410, the mobile device 100 will determine if contact has been made with at least one party predefined by the user. If contact is not made, the processing module 120 will access the storage module 110 to determine the next party on the list, in step 412, and the method will revert back to step 408 to attempt to contact the next party.

Once at least one of the alerting parties is reached in step 410, the mobile device 100 will send either a prerecorded message or digital file to the party receiving the alert (the alerting party) telling the alert party that an alert is in progress. The digital file may have been recorded and stored in the storage module 110 by the user, or alternatively may be a default message. Further, the mobile device 100 will also send the alerting party data pertinent to the mobile device 100 or user of the mobile device 100. The data sent with the alert may include but is not limited to a telephone number of the mobile device 100, a location of the device determined by the locational information module 124, etc. Furthermore, depending how the user couples the mobile device 100 to their clothing, e.g., via a belt clip, the capture module 122 will capture an image within its view and send the image along with the alert.

In one embodiment, the mobile device 100 will send an identifier, e.g., the mobile phone number of the device, along with the alert to the alerting party (AP) such as a monitoring service 312 or a server 304. The alerting party will use standard database software and computer processing power to cross associate the mobile device's phone number or any other identifier once they receive it, with a prestored identity of the user of the mobile device stored in a database such as database 306. In this manner, the alerting party can retrieve any other information that the user has given the alerting party such as their address, special medical conditions, and designated persons for the AP to contact, that the AP can use in the event of an emergency.

Figure 4B:
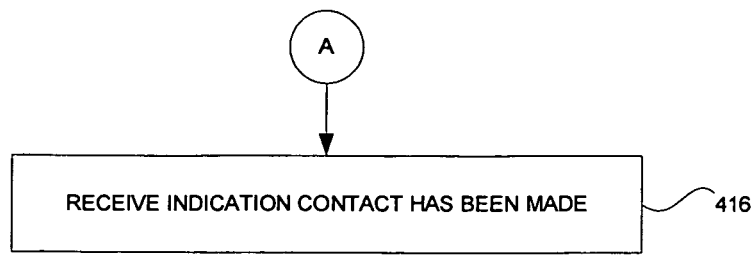

Referring to FIG. 4B, in step 416, the mobile device 100 will receive an indication from the alerting party that the alert has been received. Once the confirmation has been received, the mobile device 100 will indicate to the user that the alert has been received by at least one party, for example, via the vibration module 134 or alerting lights 111 or 206. It is to be appreciated that the vibration module 134 and alerting lights 111 and 206 may be programmed to operate in different modes, e.g., different time lengths, pulsing, etc., to distinguish different alerts to the user, e.g., an indication that an alert was sent and an indication that an alert was received by an alerting party.

Figure 4C:
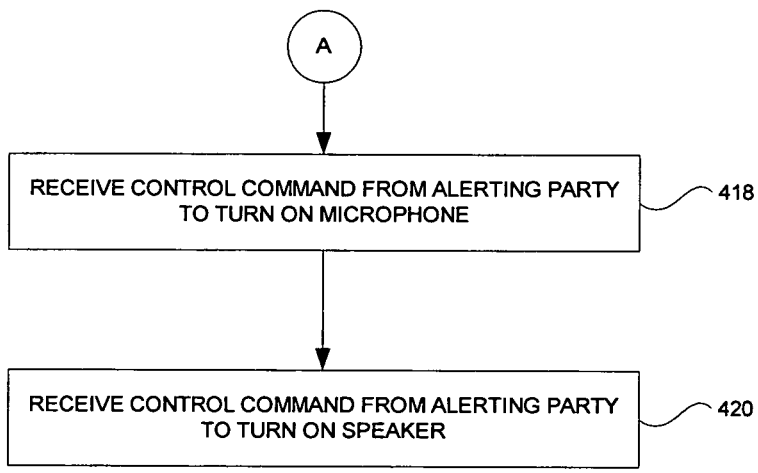

In another embodiment, the alerting party will take control of the mobile device to capture pertinent information of the situation of the user. Referring to FIG. 4C in step 418, the device will allow the alerting party to switch the microphone 114 on or off by sending a digital command to the mobile device 100 to activate or deactivate the microphone 114. In another embodiment, in step 420, the alerting party will be allowed to transmit a signal to the mobile device 100 that will switch on the speaker 116 of the mobile device 100 so that the alerting party may talk to the user. This would be particularly helpful when the alerting party wants to talk to the user of the mobile device 100 such as in a medical emergency. Furthermore, the alerting party will turn on the capture module 122 to determine if a visual view of the situation can be obtained. If so, the alerting party will control the capture module 122 to capture images, including video, to be sent to the alerting party.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed is:

1. A mobile system configured to communicate an alert, comprising:
   a mobile device; and
   a headset separate from the mobile device, wherein
   the headset includes at least one button configured to place the mobile system in a particular mode including a security mode and a normal operation mode,
   upon entering the security mode, the mobile device is configured to initiate a connection between the mobile device and a first contact within a predefined list of contacts,
   the headset includes a first button and a second button,
   the first button is configured to activate the normal operation mode, and
   the second button is configured to activate the security mode.

2. The mobile system of claim 1, wherein
   upon the connection between the mobile device and first contact not being made, the mobile device is configured to initiate a connection between the mobile device and a next contact within the predefined list of contacts.

3. The mobile system of claim 1, wherein
   upon a connection between the mobile device and at least one contact within the predefined list of contacts being made, the mobile device is configured to transmit the alert to the at least one contact.

4. The mobile system of claim 3, wherein
   the alert includes location information.

5. The mobile system of claim 3, wherein
   the alert includes a prestored message.

6. The mobile system of claim 3, wherein
   the alert includes audio information received from a microphone of the mobile device.

7. The mobile system of claim 3, wherein the alert includes image information received from a camera of the mobile device.

8. The mobile system of claim 3, wherein
   the mobile system is configured to be at least partially controlled via the made connection.

9. A method, performed by a mobile system having a mobile device and a headset separate from the mobile device and including at least one button, comprising:

placing the mobile system within a security mode;

initiating, upon the mobile system being placed within the security mode, a connection between the mobile device and a first contact within a predefined list of contacts, wherein the at least one is button configured to place the mobile system in a particular mode including the security mode and a normal operation mode, the headset includes a first button and a second button, the first button is configured to activate the normal operation mode, and the second button is configured to activate the security mode.

10. The method of claim 9, wherein initiating, upon the connection between the mobile device and first contact not being made, a connection between the mobile device and a next contact within the predefined list of contacts.

11. The method of claim 9, wherein transmitting, upon a connection between the mobile device and at least one contact within the predefined list of contacts being made, an alert to the at least one contact.

12. The method of claim 11, wherein the alert includes location information.

13. The method of claim 11, wherein the alert includes a prestored message.

14. The method of claim 11, wherein the alert includes audio information received from a microphone of the mobile device.

15. The method of claim 11, wherein the alert includes image information received from a camera of the mobile device.

16. The method of claim 11, wherein the mobile system is configured to be at least partially controlled via the made connection.

* * * * *